United States Patent
Kania

(10) Patent No.: US 6,632,055 B2
(45) Date of Patent: Oct. 14, 2003

(54) PAYLOAD HOLDER

(76) Inventor: Adam Kania, 212 Alaska St., Cheektowaga, NY (US) 14206

( * ) Notice: Subject to any disclaimer, the term of this patent is extended or adjusted under 35 U.S.C. 154(b) by 0 days.

(21) Appl. No.: 09/910,670

(22) Filed: Jul. 23, 2001

(65) Prior Publication Data

US 2002/0008184 A1 Jan. 24, 2002

Related U.S. Application Data

(60) Provisional application No. 60/217,878, filed on Jul. 12, 2000.

(51) Int. Cl.[7] .................................................. B60P 7/08
(52) U.S. Cl. .......................... 410/38; 410/34; 410/143; 410/145; 410/150
(58) Field of Search .............................. 410/32, 34, 35, 410/38, 39, 40, 41, 143, 145, 150, 151; 248/231.1, 316.1, 500; 224/403, 536, 42.38, 558, 570

(56) References Cited

U.S. PATENT DOCUMENTS

| | | | | | |
|---|---|---|---|---|---|
| 2,770,471 A | * | 11/1956 | Scott | ............................ | 410/142 |
| 2,855,217 A | * | 10/1958 | Bagwell | ........................ | 410/32 |
| 3,446,515 A | * | 5/1969 | Julian, Jr. | ...................... | 410/38 |
| 4,121,849 A | * | 10/1978 | Christopher | .................. | 410/38 |
| 4,650,383 A | * | 3/1987 | Hoff | ............................ | 410/149 |
| 5,338,136 A | * | 8/1994 | Hetchler | ...................... | 410/100 |
| 5,427,487 A | * | 6/1995 | Brosfske | ....................... | 410/121 |
| 5,688,087 A | * | 11/1997 | Stapleton et al. | ........... | 410/150 |
| 5,971,685 A | * | 10/1999 | Owens | ......................... | 410/151 |
| 6,068,433 A | * | 5/2000 | Baloga | .......................... | 410/145 |
| 6,168,359 B1 | * | 1/2001 | Smith | ............................ | 410/38 |
| 6,193,452 B1 | * | 2/2001 | Skiba | ............................ | 410/38 |

* cited by examiner

Primary Examiner—Stephen T. Gordon

(57) ABSTRACT

This invention provides a convenient, inexpensive device for securing objects in place in the load bed of a transporting vehicle, comprising an elongate frame, clamping members arranged for movably mounting opposite ends of the frame to variable positions along opposing rails on the sidewalls of the load bed, and a load securing member arranged for movably mounting to variable positions along the frame to enable direct pressure engagement of an object located a variable positions within the load bed.

19 Claims, 6 Drawing Sheets

PAYLOAD HOLDER

This application is a continuation of Provisional Patent application No. 60/217,878 filed Jul. 12, 2000.

This invention relates generally to a device for securing objects in place in the payload bed of a transporting vehicle and particularly relates to a portable device which can be quickly and conveniently mounted to common trucks and trailers for firmly securing objects resting on the payload beds thereof, from movement during transport.

BACKGROUND OF THE INVENTION

A variety of trucks, trailers and other vehicles are in common use throughout the world for the convenient transport of a wide variety of objects. Such vehicles are provided with a generally horizontal bed, commonly referred to as the payload bed, on which the objects are placed. Such bed generally comprises two or more generally rigid upstanding sidewalls along its longitudinal margins. For example, a typical dump and/or pick-up truck will comprise a generally horizontal payload bed and have generally vertical upstanding walls along a front margin and the two side margins of the bed, with a removable or pivotable upstanding wall(s), generally termed a tailgate, along the rear margin. In a typical van type delivery truck, the drivers compartment may be contiguous with, thus not walled from the generally horizontal payload bed, but again there are generally rigid vertical walls along about the side margins of the bed and generally one or more pivot doors at the rear margin. Flat bed trucks and trailers are also common transport vehicles, many having generally rigid walls along their side margins, which may be permanently fixed to the bed or removably mounted thereto.

Typically such side walls comprise generally horizontally extending rails along their length, typically being used as anchoring means for ropes, etc., to tie loads from shifting, with open top payload beds such as open flat bed trailers, pick-up, dump and the like trucks additionally having a top rail extending along the upper terminus of their upstanding sidewalls, generally provided as finished frames of the side walls, and one or more rails arranged horizontally at different height along the sidewall, generally to enable tie down of objects.

A problem with trucks designed to carry objects within their load beds is the shifting, bouncing and general movement of the objects occasioned by the turns, bumps and bounces of the vehicle during transport. A variety of tie down methods are commonly used to prevent such movement, the vast majority of which include the use of cords, straps, chains and the like which are generally arranged to be connected at the margins of the load bed then tightly pulled horizontally over the top of the object, the horizontal tightening force exerting a downward moment of force which presses the object to the bed to prevent movement of the object.

Other devices and methods have been proposed to secure items from movement on the load bed, but such have been found to be bulky and inconvenient to use and expensive to manufacture. For example, U.S. Pat. No. 4,121,849 discloses a device which is mounted to the top frame rail of the sidewalls of the load bed of a pick-up truck and comprises a horizontal screw member having opposing actuators which interact with engaging legs in a changing triangular arrangement to engage a rocking plate with an object to be secured. Such device is significantly limitative in convenience of placement along the length of the load bed of the truck and particularly limiting as to where the load to be engaged must be placed in respect to the centerline of the load bed for effective engagement.

U.S. Pat. No. 2,770,471 discloses a tubular bar arrangement which is bolted to the sidewalls of a load bed of a pick-up truck and contains a vertical center tube through which a bar can be inserted and manually pushed downward against the top of an item arranged along the centerline of the bed. The disclosed arrangement is fixed in position along the centerline of the load bed, requires drilling of holes through the sidewalls of the bed and is generally inoperative for securing items spaced from the centerline of the load bed.

U.S. Pat. No. 5,338,136 discloses a strap arrangement wherein opposite margins of the load bed comprise means which anchor the strap to the bed at the margins, with a barrel winch assembly arranged spaced upwardly on a sidewall to enable convenient tightening of the strap horizontally along the top of the object. As with any strap arrangement the horizontal tightening force of the strap creates a downward moment which presses the object to the bed to prevent movement of the object. Such arrangement is merely a unique version of commonly used strap arrangements and is limited to restraining items which are arranged along the bed in a fixed position defined by the location of the winch assembly and anchor means interacting with the strap.

It is an object of the present invention to provide a convenient means for securing objects to the load bed of a truck which is easily moveable through the length of the load bed and removable and transferable from vehicle to vehicle.

It is another object of the present invention to provide a securing means which can conveniently secure items positioned at different places within a load bed of a truck.

These and other objects of the invention will become readily apparent from the following description and claims.

SUMMARY OF THE INVENTION

The present invention provides a simple and inexpensive device for securing objects to a load bed of a vehicle, the device being conveniently removably and movably mounted to upstanding sidewalls of a load bed of a truck, trailer or the like, in an arrangement which enables point of location securing of items positioned within the margins of the load bed. In its most general form, the device comprises an elongate base support frame, clamping means arranged for mounting opposite ends of the base support frame to suitable opposing rails on the sidewalls of the load bed, and a twist threaded load securing means, arranged to engage the object to be secured and retain the object between the base support frame and the floor of the load bed.

The base support frame is an elongate, preferably tubular polygonal box, "H" or U" shaped channel configured member, having a plurality of spaced openings along its length, the frame being of fixed or adjustable length sufficient to span the distance between opposing rails of opposing sidewalls of a payload bed of a vehicle.

When the base support frame comprises a polygonal box channel configuration, spaced openings are contained longitudinally along facing generally parallel top and bottom opposing walls thereof, with spaced openings being in general mating alignment to enable the passage of an elongate load securing means, such as a rod or the like generally about perpendicularly through the frame. It should be understood that by polygonal tubular arrangement is meant any polygonal arrangement in which top and bottom sides are about parallel, the common four wall tubular box channel being preferred.

When the base support frame comprises an elongate generally "H" or "U" shaped channel configuration having generally about parallel opposing legs connected by a central base, the spaced openings are contained longitudinally along the central base. The opposite ends of the base frame member are generally configured to enable engagement and/or securing the frame to an under and/or top surface of a longitudinal rail contained along the sidewall of a load bed of a truck, by means of integral or removably mounted clamp members. Generally, an adjustable length base frame can be accomplished by telescoping a smaller dimensioned polygonal "box" or "U" channel tubular length into a larger dimensioned box and/or "U" channel tubular length, or combinations of box, "H" and "U" shaped configurations.

In one embodiment of the invention, clamp members are integrally arranged at opposite ends of the base frame and generally comprise an "L" or "C" shaped element, such as a plate, bar and the like, with one leg thereof welded or otherwise mounted along about the end of the frame member and the other leg comprising a threaded hole or reinforced threaded hole through which a mating threaded clamping rod, thumb screw or the like can be extended for engaging and clamping the end of the frame member to a rail. In the "L" configured embodiment, the rail generally engages a surface of the base frame member at about an end thereof, while in the "C" configuration, the rail generally engages an inside surface of a leg of the bar or plate element.

In another embodiment, the clamp members comprise a polygonal box element with interior sizing enabling the box element to be telescopically slidably mounted over the end of the "box", "H" or "U" shaped channel element. An exterior surface of the box element generally comprises an "L" or "C" shaped plate element with one leg welded or otherwise mounted along the box element and the other leg comprising the threaded hole to accept mating threaded bolt or the like for clamping the clamp member to the rail. Generally in this arrangement, means are provided for fixing the box element at a position along the base frame, for example a side of the box element may comprise a threaded hole and thumb screw means or the like for jam engagement with the an end of the base frame to secure it in the box element.

The load securing means, generally comprises an elongate threaded shaft, preferably having a footed end element arranged at one end for engaging an object to be secured, and an opposite tightening end.

The plurality of openings arranged along the length of the base frame are sized to accept the elongate threaded shaft therethrough. In one embodiment the elongate threaded shaft is sized to engage mating threads of said openings. It should be understood that by mating threads of said openings is meant to include reinforced openings, for example an opening in the frame which itself may be larger than the threaded shaft, but to which a threaded nut, plate or the like is welded or otherwise fixed to the base frame member in alignment with the opening to enable threading the shaft through the opening.

In another embodiment, the openings are greater in diameter than the threaded shaft and a restraint element is provided, such as a plate, large nut or the like, having a threaded hole and/or reinforced hole sized to engage mating threads of the threaded shaft for mounting therethrough. In one configuration the restraint element is sized to loosely fit within the interior space defined by the interior margins of the legs of the "H" or "U" shaped channel member. In another configuration, a plate is sized larger than the distance between the legs of the "H" or "U" shaped channel, so as to rest on the ends of the legs of an "H" or "U" shaped channel member or sized to rest along the undersurface of a box member. In still another configuration the restraint element is polygonal such as "box" or "H" or "U" configured, sized and arranged to slidably surround multiple sides of the box, "H" or "U" shaped channel and be moved along the base frame in alignment with the desired hole(s) of the base frame member which correspond to the position of the object. As with other plate configurations, the box configured restraint element comprises a threaded hole and/or reinforced hole sized to engage mating threads of the threaded shaft for mounting therethrough in alignment with a hole(s) in the base frame member.

The footed end element of the threaded shaft can be of any convenient size and shape, its functional purpose being to engage directly or indirectly against the object to be secured. In a preferred embodiment the footed end element is configured to be pivotally mounted to the end of the threaded shaft to enable convenient securing of a surface of an object which may not be perpendicular to the threaded shaft. In various other embodiments, the object engaging surface of the footed end element may comprise a resilient pad, slip resistant surface or the like and/or an enlarged and/or pivotable plate for engaging large surfaces, permanently or removably mounted to the threaded shaft.

Though one or more load securing means permanently mounted through a particular hole(s) in the base frame is within the contemplation of the present invention, it is generally preferred that a securing means be removable from any particular hole along the frame member and easily inserted in another hole along the base frame member.

In conventional operation of the device of the invention the shaft is arranged for threaded downward and upward movement through the frame member to move the footed end thereof toward and away from the object to be secured. Movement downward engages the object and the fixed position of the frame member enables firmly tightens the object between the securing member and the floor of the load bed. Manipulating the threaded shaft generally requires leveraged means at the tightening end for convenient turning of the threaded shaft, and since such means for leveraged turning and the footed end element are generally sized to preclude removal through the threaded hole, it is preferred that either or both the footed end element and the leveraged turning means be removable or at least be configured to enable passing through the threaded hole.

In one embodiment of the invention, the tightening end of the threaded shaft is generally configured to be a diameter less that the threaded diameter of the shaft and slotted or configured to enable engagement with a removable handle or various tools such as screw drivers, wrenches, sockets, Allen wrenches or the like to enable convenient levered turning of the shaft. In a particularly preferred embodiment, the tightening end is slotted to accept a mating flat end of a shaft pivotally connected to the slot by pin means, the shaft being enabled to be pivoted to a position along the centerline of the threaded shaft for passing through the threaded hole or the like and then pivoted to a position about perpendicular to the threaded shaft for tightening and loosening.

Installed, the base frame member is mounted between the sidewalls of the load bed preferably with either the outer surface of the base frame member or an inner surface of the "U" shaped clamp member engaging an underside surface of the rail, and the clamping bolt or screw of the clamp member being tightened to engage the upper surface of the rail, holding the elongate base frame member in position as desired along the length of the load bed. In an alternate arrangement, the base frame member lays on top of a rail and the clamping bolt engages the underside of the rail for retaining position. The latter arrangement is not generally desired as the pressure in securing an object against the floor of the load bed is generally translated through point engagement of the clamping bolt with the underside of the rail and can deform a light weight rail. The former arrangement with the base frame member engaging the underside of the rail, spreads the securing pressure over the surface of the base frame member, reducing the risk of deformation of the rail.

The threaded shaft members are generally removed from the device for storage when not in use, generally the shaft being sized to enable installation from the underside upwardly through the threaded hole.

Other modes and embodiments of the invention will become apparent from a description of certain present preferred embodiments thereof shown in the drawings.

DESCRIPTION OF THE PREFERRED EMBODIMENTS

Figure 1:
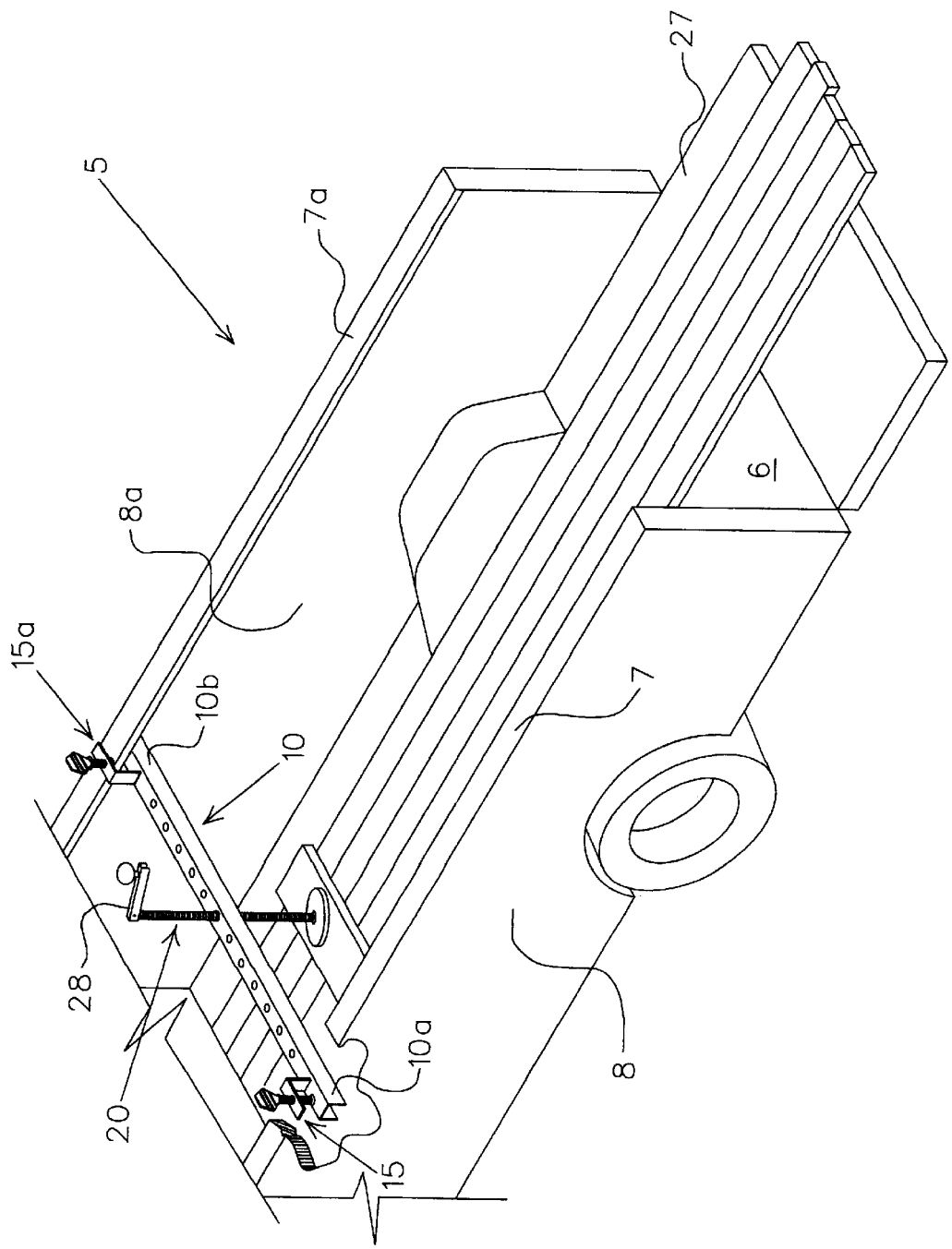
FIG. 1 is a perspective view of a device of the invention mounted to the top rails of the side walls of the load bed of a truck, shown securing objects from movement.
Figure 1A:
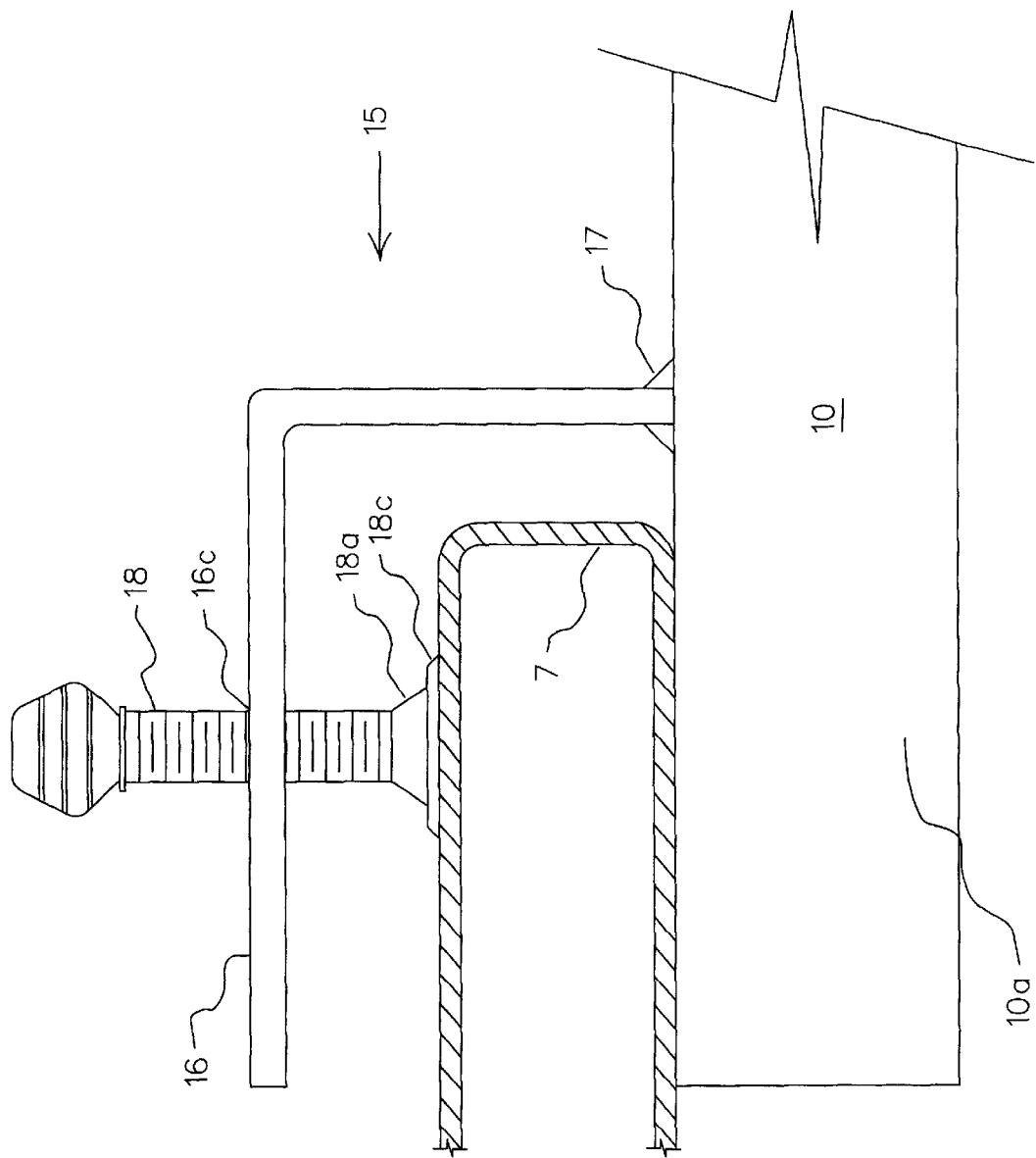
FIG. 1a is a fragmented front plan view of the end clamp of FIG. 1.
Figure 1B:
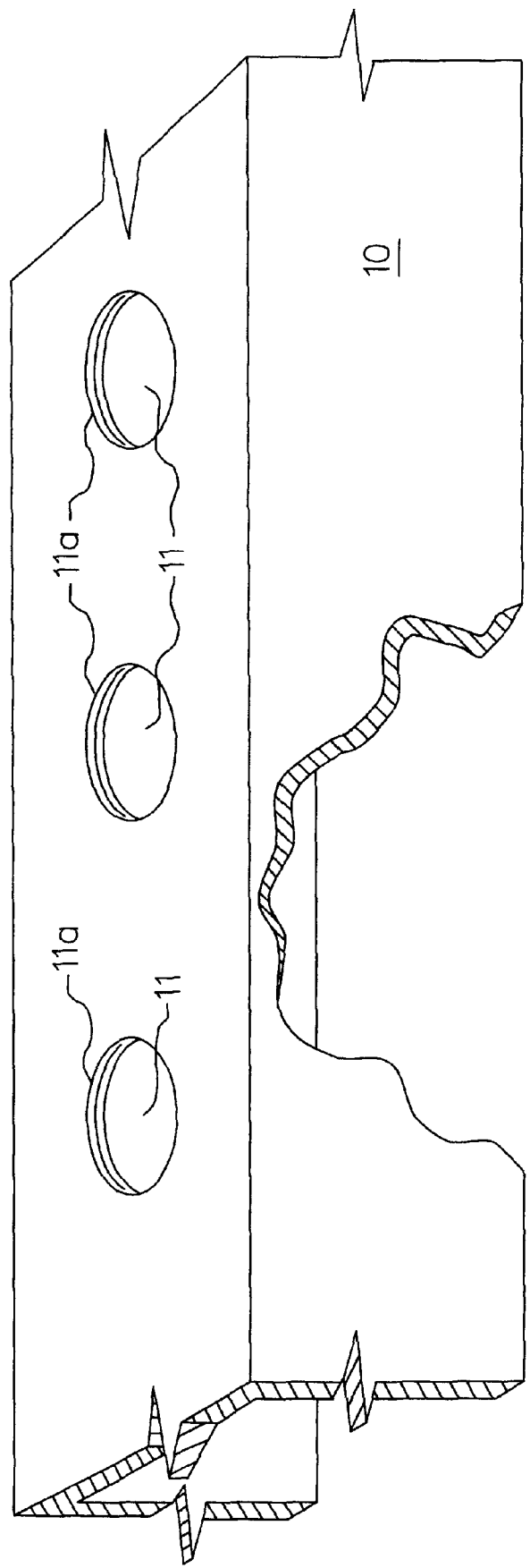
FIG. 1b is a fragmented, sectioned, perspective view of a portion of the support frame of FIG. 1.

Referring first to FIGS. 1, 1a, 1b and 1c, therein is shown a pay load holder of the invention comprising an elongate base support frame member 10, end clamps 15 and 15a arranged to secure the base support frame member to sidewalls 8 and 8a of load bed 6 of pick-up truck 5, and load securing member 20.

Base frame member 10 is illustrated as comprising an elongate U" shaped channel member, having a plurality of threaded 11a, openings 11 spaced along its length. The base frame member is shown sized sufficient to extend between the undersides of finish rails 7 and 7a on sidewalls 8 and 8a of the bed. Opposite ends 10a and 10b of base frame member 10 are illustrated as comprising end clamps 15 and 15a respectively, which engage finish rails 7 and 7a respectively to clampingly secure frame member 10 thereto. In the illustrated embodiment, end clamp 15 comprises "L" plate 16, which is shown as welded 17, to opposite end 10a of base frame member 10. "L" plate 16 comprises threaded hole 16c, which is sized to mate with threaded thumb screw 28. Thumb screw 18 is illustrated as comprising a resilient pad 18c tipped pivot foot 18a, arranged to adjustably engage rail 7 to removably fasten opposite ends of the base frame member to the underside of the rails.

Figure 1C:
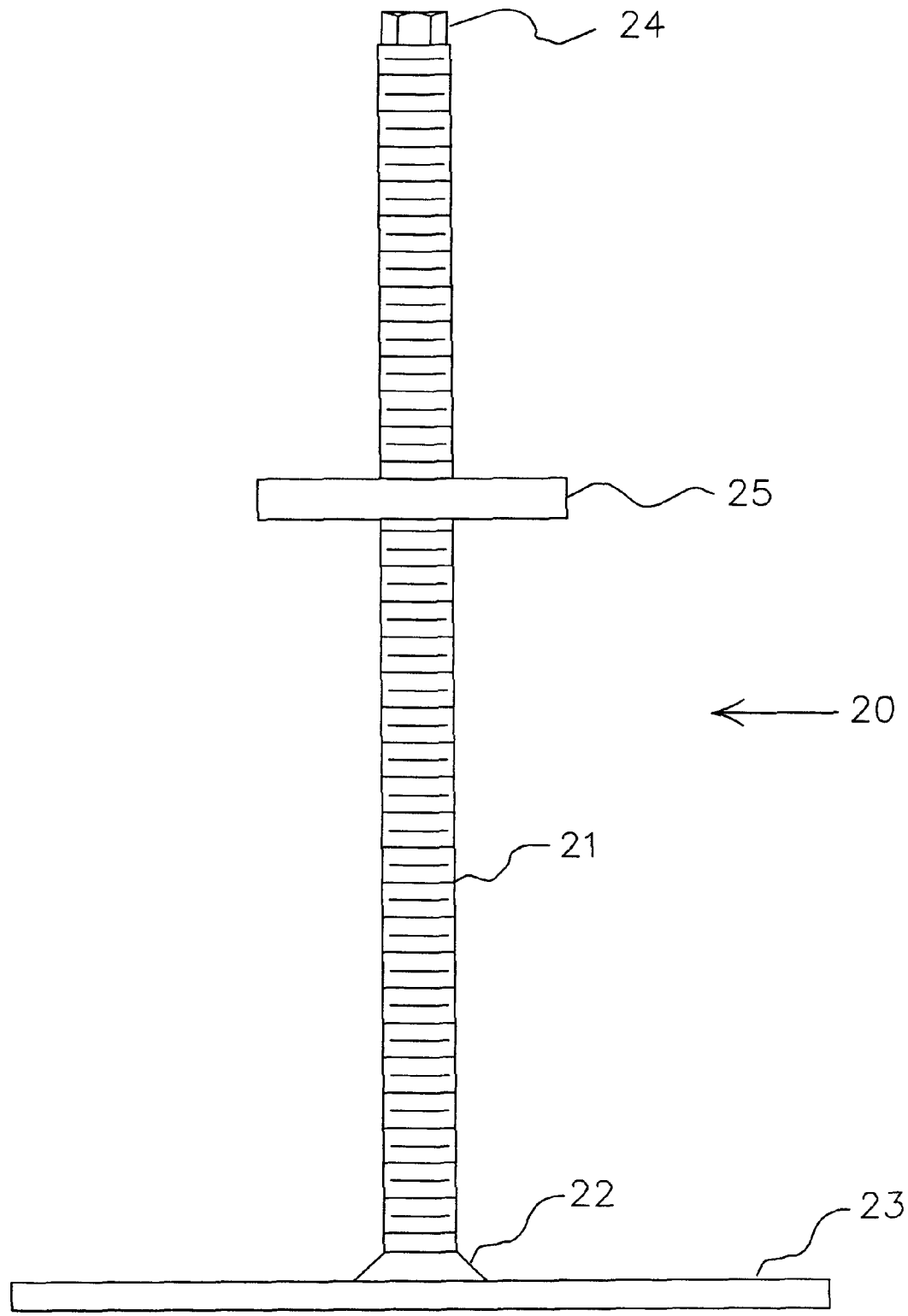
FIG. 1c is a front plan view of the load securing shaft of FIG. 1.

Load securing member 20 is illustrated in FIG. 1c as comprising threaded shaft 21, pivot foot 22, end plate 23 and hex configured end 24. Threaded shaft 21 is sized to matingly engage threaded openings 11 of base frame member 10, and end 24 is illustrated as being sized to pass through threaded openings 11. In assembly for use, threaded shaft 21 is threaded upwardly through a selected threaded opening 11. Objects, such as boards 27, to be secured are positioned between end plate 23 and load bed 6 and shaft 21 is threaded downwardly to press the object against load bed 6 securing the object to the bed. End 24 of the threaded shaft can generally be sized and configured to be engaged by any suitable tool such as a wrench, removable handle and the like to enable convenient leveraged tightening of the object against the load bed. FIG. 1 illustrates end 24 as comprising a permanent handle 28 embodiment, with the pivot foot being removable for insertion of the securing means through a threaded opening in the base frame member.

FIG. 1c illustrates a plate 25 arranged along threaded shaft 21. Plate 25 comprises a threaded hole through which plate 25 is matingly threaded onto threaded shaft 21. In this arrangement, the threaded plate is sized to fit against the central base of the "U" shaped channel between the parallel legs, opposite openings 11. Such arrangement can be used in embodiments wherein openings 11 are threaded, but have particular use in embodiments wherein openings 11 are not threaded and are larger than the diameter of threaded shaft 21.

Figure 2:
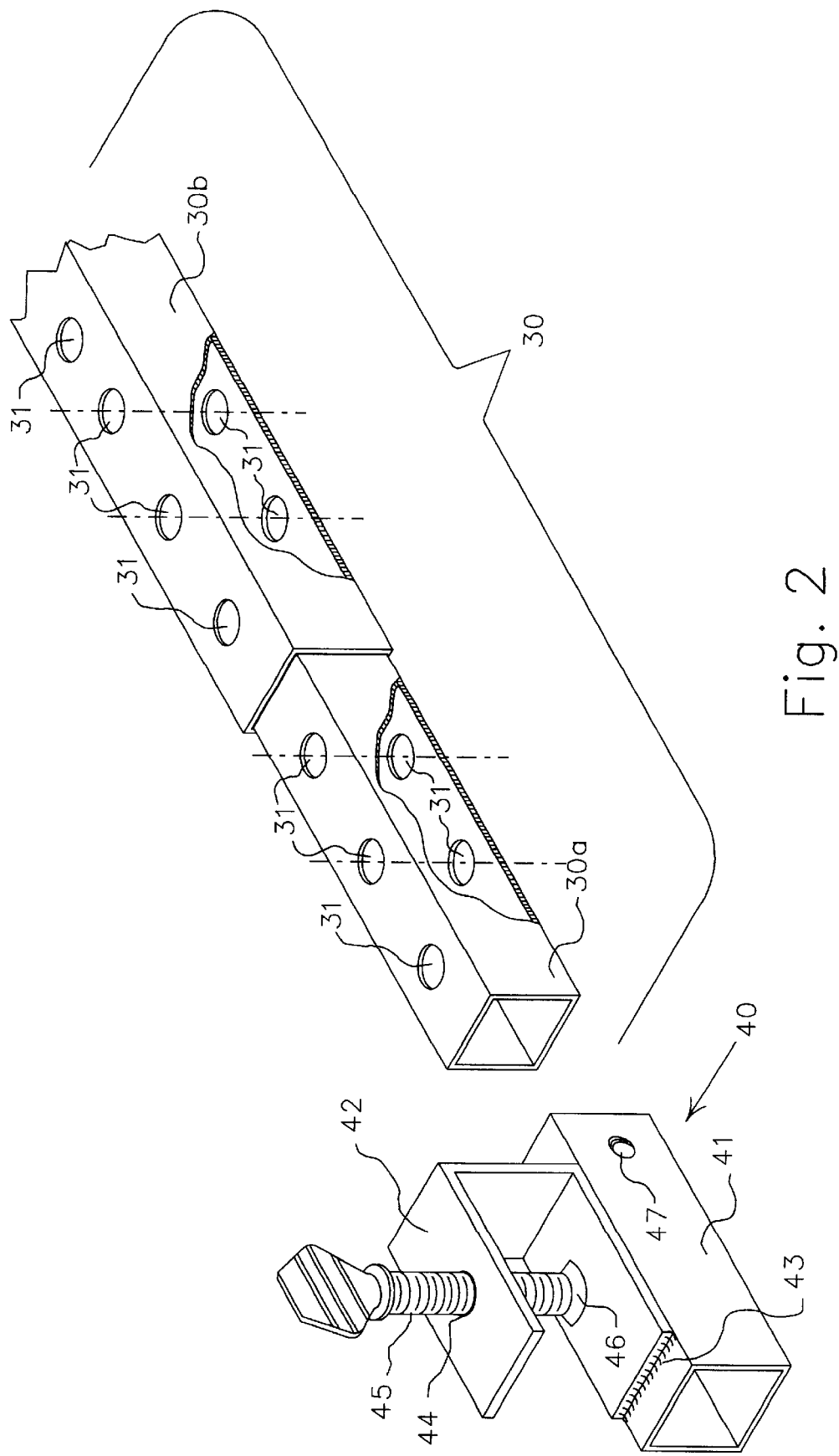
FIG. 2 is an exploded, partially sectioned, perspective view of another embodiment of the invention.
Figure 3:
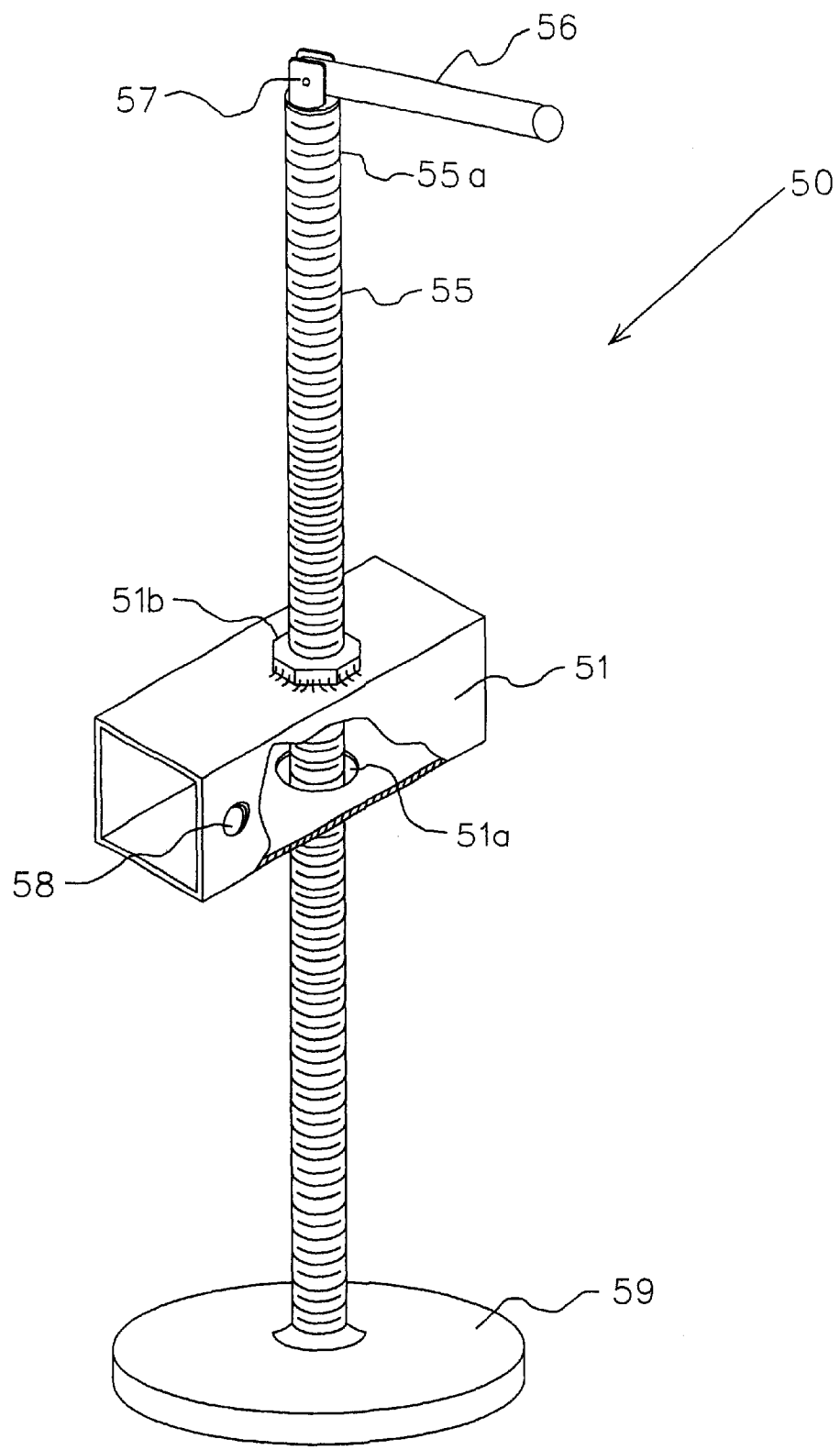
FIG. 3 is a partially sectioned, perspective view of a load securing member of the invention.

FIGS. 2 and 3 illustrate an embodiment of the invention wherein base frame member 30 comprises an elongate polygonal telescoping box tube arrangement. In this illustrated embodiment, elongate frame member 30 comprises an elongate quadrilateral box tube 30a, sized in interior dimension suitable for sliding over smaller sized exterior dimensioned elongate quadrilateral box tube 30b in telescopic fashion. Such telescoping arrangement among the box tubes provides adjustable length to frame member 30 enabling use thereof for different width load beds, with the added benefit of further stiffening the base frame member along its length. A plurality of aligned spaced holes 31, are contained through opposing top and bottom sides of both box tubes 30a and 30b, holes on opposing sides being aligned to enable passage of load securing shaft 55 about perpendicular to the centerline of the frame member.

In a preferred embodiment, the holes through the top and bottom sides of each box tube are about equally spaced, so that upon telescopic assembly for use, the plurality of holes in box tube 30a can be aligned with the plurality of holes in box tube 30b so that load securing shaft 55 can be conveniently moved and inserted about perpendicular through the box tubes at any desired position along frame member 30 wherein the holes among the two box tubes align.

End clamp member 40 is illustrated as comprising a shortened quadrilateral box component 41, sized in interior dimension suitable for insertion over an end of smaller sized exterior dimensioned quadrilateral box tube 30b. In practice, quadrilateral box member 41 is sized to generally correspond to the sizing of box tube 30a. Box member 41 is illustrated as comprising a threaded opening 47, enabled to accept a screw, bolt or the like, which upon assembly for use can be inserted to enable jam engagement against the end of quadrilateral box tube 30b for retention of box tube 30b in box member 41.

In this illustrated embodiment, end clamp member 40 is shown as comprising a "U" plate 42 which is welded 43 to the exterior surface of box member 41, and comprises a threaded hole 44, which is sized to mate with threaded thumb screw 45. Thumb screw 45 is illustrated as comprising pivot foot 46 which is arranged to enable securely fastening clamp member 40 to the underside of a rail along a wall of a load bed.

A further end clamp member 40a (not shown) is provided for engaging the opposite end of frame member 30 (not shown) to a rail. Clamp member 40a is configured generally the same as clamp member 40 with the corresponding quadrilateral box member 41a, not shown, being larger sized in interior dimension to enable mating insertion of the end of larger sized quadrilateral frame box member 30a therein.

Load securing member 50, is illustrated as comprising a threaded shaft 55, foot 59 and quadrilateral securing box member 51. Box member 51 is sized in interior dimension suitable for insertion of quadrilateral box member 30a therethrough. In practice, box member 51 is sized to generally correspond to the sizing of component box member 1a of clamp member 40a.

Securing box member 51, is illustrated as comprising an opening 51a on its underside and a corresponding aligned reinforced threaded opening 51b on its top side, the arrangement enabling the insertion of threaded shaft 55 through opening 51a and threading said shaft through reinforced threaded opening 51b. The top end 55a of shaft 55, is slotted to accept an end of handle 56, which is retained pivotally in place by pin 57. Handle 56 is not threaded and is dimensioned in diameter smaller than threaded shaft 55, to enable passage thereof through threaded opening 51b.

In assembled use, securing box member 51 is slipped over frame box member 30a and can be moved along frame member 30 limited only by abutting against the clamp members retaining frame member 30 in place on the sidewalls of the load bed. In operation securing box member 51 is moved along frame member 30 to a desired position, the aligned openings in the top and bottom surface of the securing box member being placed in alignment with aligned openings in the box frame members. The handle of the threaded shaft is moved into a position aligned along the centerline of the threaded shaft and inserted upwardly through opening 51a of securing box member 51, through the aligned openings in the box frame members and into reinforced threaded opening 51b, with the threaded shaft engaging the threads of the reinforced opening. In the illustrated embodiment, securing box member 51 comprises a further threaded opening 58, enabled to accept a screw, bolt or the like, which can be inserted to enable jam engagement with a tubular frame member for retention of the securing box member at a desired position along the length thereof.

It should be understood, that various alternate embodiments and configurations of the various components are contemplated as within the invention. Thus, for example it is contemplated that "U" channel frame members may be telescoped to produce a base frame member, the members being retained in place by one or more securing box members along their length, or by bolt means and the like retaining "U" channel members to each other. For further example "H" or "U" shaped channel members as illustrated in FIG. 1 may be secured to side wall rails by box member configured clamp members as illustrated in FIG. 2 and the like. A plurality of securing means might be arranged on a base support frame, handles and/or boots may be removable from the threaded shaft for easy installation and the like.

While certain preferred embodiments have been shown and described, it is distinctly understood that the invention is not limited thereto but may be otherwise embodied within the scope of the following claims.

I claim:

1. A device for securing an object to the load bed of a vehicle, comprising:
   an elongated base support frame having opposite ends, said frame comprising two about parallel elongate sides connected by a third elongate side arranged about perpendicular to said about parallel sides, said third elongate side having a plurality of spaced openings arranged along about its length;
   clamping means, arranged for mounting said opposite ends of said frame to opposing rails arranged on upstanding sidewalls of said load bed of said vehicle;
   a load securing means, comprising an elongate twist threaded shaft, said shaft having a means arranged at one end for engaging an object to be secured and being configured at an opposite end to enable leveraged turning of said shaft; and
   means for twist threading said shaft through at least one of said plurality of spaced openings in said frame.

2. The device of claim 1 wherein said elongate support frame is selected from "U" shaped channel member, "H" shaped channel member and polygonal tubular member.

3. The device of claim 2 wherein said elongate support frame comprises a polygonal tubular member having a plurality of spaced openings along the length of two facing about parallel sides, said openings being in mating alignment.

4. The device of claim 3 wherein said polygonal tubular member comprises four sides.

5. The device of claim 1 wherein an end of said support frame coacts with said clamping means to securely clamp said rails.

6. The device of claim 1 wherein said clamping means is fixedly mounted to an end of said elongated support frame.

7. The device of claim 1 wherein said clamping means is removably mounted to an end of said elongated support frame.

8. The device of claim 1 wherein said clamping means comprises a threaded rod means arranged to engage a rail.

9. The device of claim 1 wherein said clamping means comprises a polygonal tube member sized to slide over an end of said base support frame.

10. The device of claim 9 wherein said clamping means comprises a threaded rod means arranged to engage a rail.

11. The device of claim 1 wherein said opposite end of said elongate threaded shaft is polygonal configured.

12. The device of claim 11 wherein the polygonal configuration is arranged to matingly engage a standard wrench.

13. The device of claim 1 wherein said opposite end of said elongate threaded shaft is slotted.

14. The device of claim 13 wherein said slot comprises a pivotally connected elongate shaft, arranged to pivot from a position along about a centerline of said threaded shaft to a position angled from said centerline.

15. The device of claim 1 wherein said means for twist threading comprises at least one twist threaded opening through said third side of said base support frame.

16. The device of claim 1 wherein said means for twist threading comprises twist threaded means adjacent at least one of said plurality of spaced openings of said base support frame.

17. The device of claim 16 wherein said means for twist threading is fixedly connected to said base support frame.

18. The device of claim 16 wherein said means for twist threading comprises a polygonal tube member sized to slide along said base support frame.

19. The combination of a vehicle having a load bed with upstanding sidewalls and a device comprising:

an elongated base support frame having opposite ends, said frame comprising two about parallel elongate sides connected by a third elongate side arranged about perpendicular to said about parallel sides, said third elongate side having a plurality of spaced openings arranged along about its length;

clamping means, arranged for mounting said opposite ends of said frame to opposing rails arranged on upstanding sidewalls of said load bed of said vehicle;

load securing means, comprising an elongate twist threaded shaft, said shaft having means arranged at one end for engaging an object to be secured and being configured at an opposite end to enable leveraged turning of said shaft; and means for twist threading said shaft through at least one of said plurality of spaced openings in said frame.

* * * * *